United States Patent [19]

Fletcher et al.

[11] 3,737,639
[45] June 5, 1973

[54] DERIVATION OF A TANGENT FUNCTION USING AN INTEGRATED CIRCUIT FOUR-QUADRANT MULTIPLIER

[76] Inventors: James C. Fletcher, Administrator of the National Aeronautics and Space Administration with respect to an invention by; Bernard J. Bregman, Littleton, Colo.

[22] Filed: May 17, 1972

[21] Appl. No.: 254,177

[52] U.S. Cl. .................. 235/186, 235/194, 235/197
[51] Int. Cl. ........................ G06g 7/16, G06g 7/22
[58] Field of Search ............... 235/197, 186, 189, 235/194, 195, 196, 150.25, 61.5 E

[56] References Cited

UNITED STATES PATENTS

| | | | |
|---|---|---|---|
| 2,953,303 | 9/1960 | Sedgfield | 235/150.25 |
| 2,948,474 | 8/1960 | Seay | 235/197 |
| 3,250,904 | 5/1966 | Vasu et al. | 235/186 |
| 3,496,565 | 2/1970 | Jenkins | 235/186 X |
| 3,601,593 | 8/1971 | Preston | 235/197 X |
| 3,646,337 | 2/1972 | Bifulco, Jr. | 235/186 |

Primary Examiner—Joseph F. Ruggiero
Attorney—Marvin J. Marnock, Marvin F. Matthews and John R. Manning et al.

[57] ABSTRACT

A tangent function generator is provided which utilizes input signals proportionate to the sine and cosine of a given angle. The equipment accomplishes a trigonometric manipulation which forms an output signal substantially independent of the input reference voltage but proportional to the tangent of the angle. The device uses a multiplier and operational amplifier.

4 Claims, 1 Drawing Figure

PATENTED JUN 5 1973
3,737,639
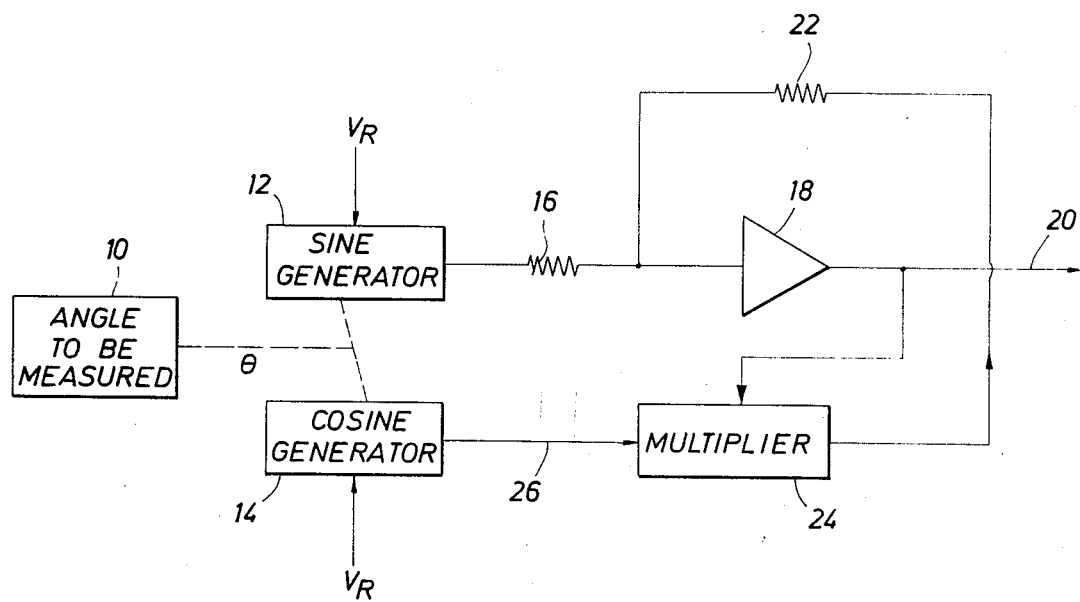

DERIVATION OF A TANGENT FUNCTION USING AN INTEGRATED CIRCUIT FOUR-QUADRANT MULTIPLIER

BACKGROUND OF THE INVENTION

In control systems, trigonometric functions are quite often required. Many trigonometric functions have been generated in the past through the use of large mechanical resolvers. However, such equipment is unduly complicated and being mechanical in nature, is substantially larger and consumes more power than can be permitted in many cases. Diode circuits have been used in the past to approximate a range of trigonometric functions but they have no versatility inasmuch as the approximate curve generated is not usually subject to change. Accordingly, many devices known in the prior art have only provided less than adequate simulation or approximation of a particular trigonometric function.

While some function generators for sine and cosine functions have met with adequate success, function generators for the tangent or cotangent have been rather deficient. Generators of this sort are quite often required in equipment such as inertial guidance systems, gun control radar systems, and various and sundry control circuits.

SUMMARY OF THE INVENTION

The present invention is summarized as providing an integrated circuit tangent function generator. More particularly, it utilizes as an input, signals representative of the sine and cosine of a given angle. The circuitry incorporates an operational amplifier and a multiplier circuit which together form an output signal proportionate to the tangent of the angle. The output signal formed is substantially independent of the reference voltage of the sine and cosine functions. The output signal has a high degree of accuracy, having an error of approximately 10 minutes of arc or less, for angles between +45° and −45°.

BRIEF DESCRIPTION OF THE DRAWING

The single FIGURE is a schematic block diagram of the circuit of the present invention which generates a tangent function.

DESCRIPTION OF THE PREFERRED EMBODIMENT

In the single view, the numeral 10 indicates some form of apparatus which generates an angle to be measured. The angle to be measured can be generated either mechanically or electronically. It may have the form of a rotation of a particular shaft or other mechanical apparatus. On the other hand, it may achieve the form of an analog or digital representation of the angle to be measured. In any case, the angle source 10 is incorporated in the single drawing to point out very generally that the angle is generated in some suitable form and is subsequently used by the function generator comprising the present invention. The apparatus 10 is connected in some suitable manner to a sine generator 12. Additionally, the angle to be measured is supplied as an input to a cosine generator 14. Both the sine and cosine generators are provided with the same reference voltage inputs which are indicated in the drawing. As will be appreciated, the maximum value of the sine and cosine functions swing between 1.000 to −1.000. The reference voltage is a suitable voltage level such as perhaps 10 volts RMS which is provided to the sine and cosine generators 12 and 14 to cause the output signals to swing between selected levels. Quite obviously, if the reference voltage is 10 volts, the output swing may be from +10 volts to −10 volts.

The apparatus further incorporates an input resistor 16. The resistor 16 provides an input for an operational amplifier 18. While many operational amplifiers are made, a suitable operational amplifier is that manufactured by National Semi-Conductor bearing model number LM101A. This is an integrated circuit operational amplifier which is more than suitable for the purposes herein mentioned. The connection of the operational amplifier 18 to the sine generator 12 through the resistor 16 helps form an output signal on a conductor 20 which output signal is the signal proportionate to the tangent of the particular angle generated by the apparatus 10 as will be described in detail hereinafter.

The operational amplifier is incorporated in the circuitry with a feedback loop. Hence, a feedback resistor 22 is connected to the input of the operational amplifier 18. The signal supplied to the resistor 16 is not the signal directly from the output line 20 but rather the output from the multiplier circuit 24. Again, many multiplier circuits are known, but a suitable integrated circuit multiplier is that manufactured by Motorola and bearing model number MC1595L. Quite clearly, other multipliers can be used if desired. Moreover, a conductor 26 supplies the signal from the cosine generator 14 to the multiplier 24.

For consideration of the operation of the circuitry, some equations have been developed below which will explain its operation.

The output of the multiplier circuit 24 will be first considered. This output voltage is given below in Equation 1:

$$V_{24} = (V_R \cos \theta)(V_{20})$$

Equation 1 reflects that the output of the multiplier circuit is the product of the two input voltages. One input voltage is from the cosine generator 14 while the other is the output voltage from the operational amplifier.

Next, the voltage output by the operational amplifier should be considered. In the operational amplifier 18, the input impedance is quite high, typically measuring in the megohm range or greator. In effect, this means that the input current is so negligible as to be almost nonexistent and indeed, it is so small that it can be ignored. Accordingly, the current flowing through the resistor 16 must equal the current flowing through the resistor 22. The current flowing through the resistor 16 is a function of the output signal from the sine generator 12. The current flowing through the resistor 22 is a function of the signal from the multiplier 24. Equating these two currents, Equation 2 is thus obtained:

$$V_R \sin \theta / R_{16} = -V_{24}/R_{22}$$

Equation 2 can be arranged to a different form by rearranging variables and hence, Equation 3 is thus obtained:

$$-V_{24} = R_{22}/R_{16} (V_R \sin \theta)$$

Since the same quantity is found on the left hand side of both Equation 1 and Equation 3, the right hand sides can be equated to obtain Equation 4:

$$-V_{20} (V_R \cos \theta) = R_{22}/R_{16} (V_R \sin \theta)$$

Rearranging variables to isolate the output voltage of the operation amplifier on the left, Equation 5 is thus obtained:

$$V_{20} = -R_{22}/R_{16} (V_R \sin \theta)/(V_R \cos \theta)$$

On inspecting Equation 5, it will be noted that the reference voltage drops out and moreover, the trigonometric functions can be rewritten to incorporate the tangent. Thus, Equation 6 is obtained:

$$V_{20} = -R_{22}/R_{16} \tan \theta$$

On inspecting Equation 6, it will be noted that the output signal is completely independent of the reference voltage. Moreover, it is proportional to the two resistors and the tangent of the angle being measured.

The foregoing describes the tangent generator of the present invention. However, if the sine and cosine generators 12 and 14 shown in the single drawing are reversed in position, a cotangent generator is provided, it being observed that the sine and cosine functions of Equation 5 would be inverted.

In application, the circuitry shown in the single drawing has been implemented and has been used over a range of ±45° variation. In such application, the error of the tangent generator has been less than 10 minutes of arc.

The foregoing is directed to the preferred embodiment of the present invention. As will be understood, other types and sources of supply of integrated circuits can be utilized. Numerous operational amplifiers are in the market including those manufactured by Fairchild; Texas Instruments, and other manufacturers. Additionally, other multipliers are also known but the multiplier mentioned for the preferred embodiment is preferable inasmuch as it has the ability to handle four-quadrant signals. In other words, the multiplier can handle input signals of like or dissimilar polarities. This permits the formation of a negative or positive output signal.

The foregoing is directed to the preferred embodiment but the scope of the present invention is determined by the claims which are as follows:

We claim:

1. A tangent function generator for generating a signal proportionate to the tangent of a given angle derived from inputs of the sine and cosine of the given angle wherein the sine and cosine functions are referenced to a given reference voltage and comprising a circuit means for forming an output signal proportional to the function $\sin \theta/\cos \theta$ where the trigonometric functions of $\theta$ are represented by the input signals to the generator and said output signal is substantially independent of the given reference voltage and is proportional to the ratio of the value of at least two fixed circuit components, said circuit means including operational amplifier means coupled to receive said sine function signal as an input and multiplier circuit means having two inputs and forming an output corresponding to the multiplication of the inputs, one of said two inputs being the cosine function signal and the other input being provided from the output of the operational amplifier.

2. The function generator of claim 1 wherein said amplifier receives a second signal as a feed back signal applied to the input of said amplifier which signal is derived from the output of said multiplier circuit means.

3. A function generator as described in claim 2 wherein said multiplier means is connected at its output through a first fixed resistor and the sine function is input through a second fixed resistor and the tangent output signal is proportional to the ratio of the former to the latter.

4. A function generator of the character described in claim 2 wherein said multiplier circuit means is a four-quadrant multiplier for multiplying input signals of like or dissimilar polarities.

* * * * *